United States Patent Office 3,491,541
Patented Jan. 27, 1970

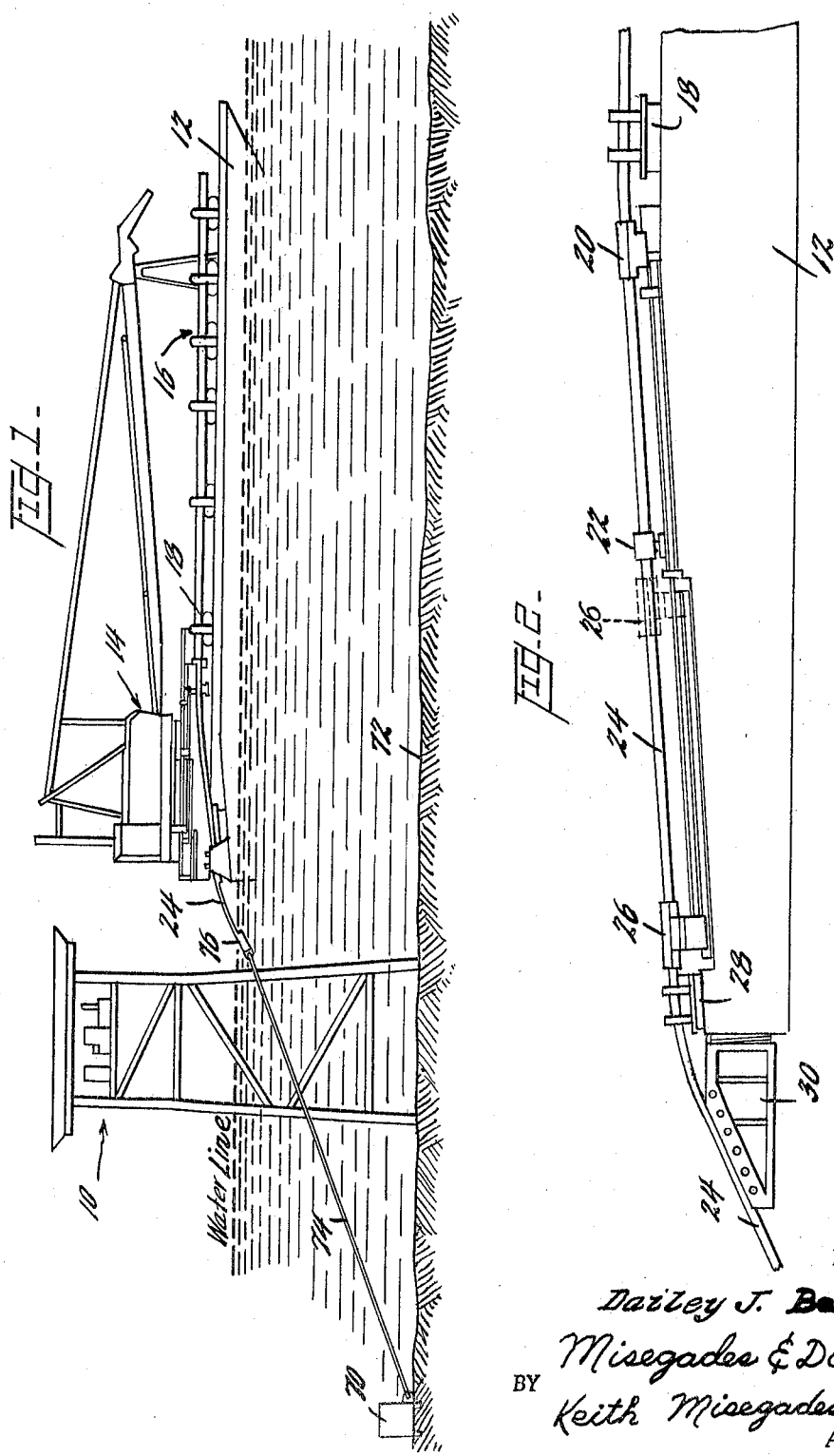

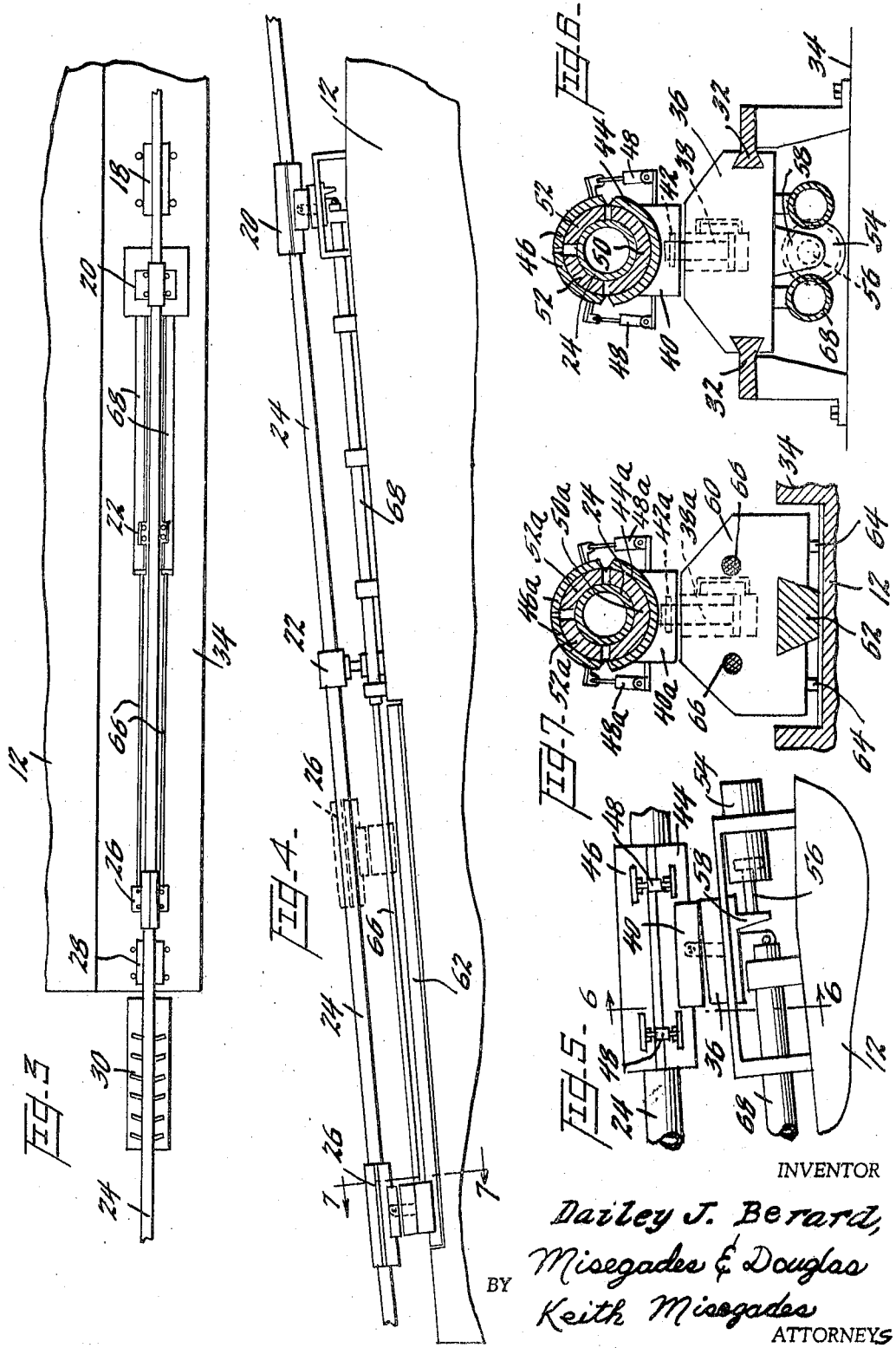

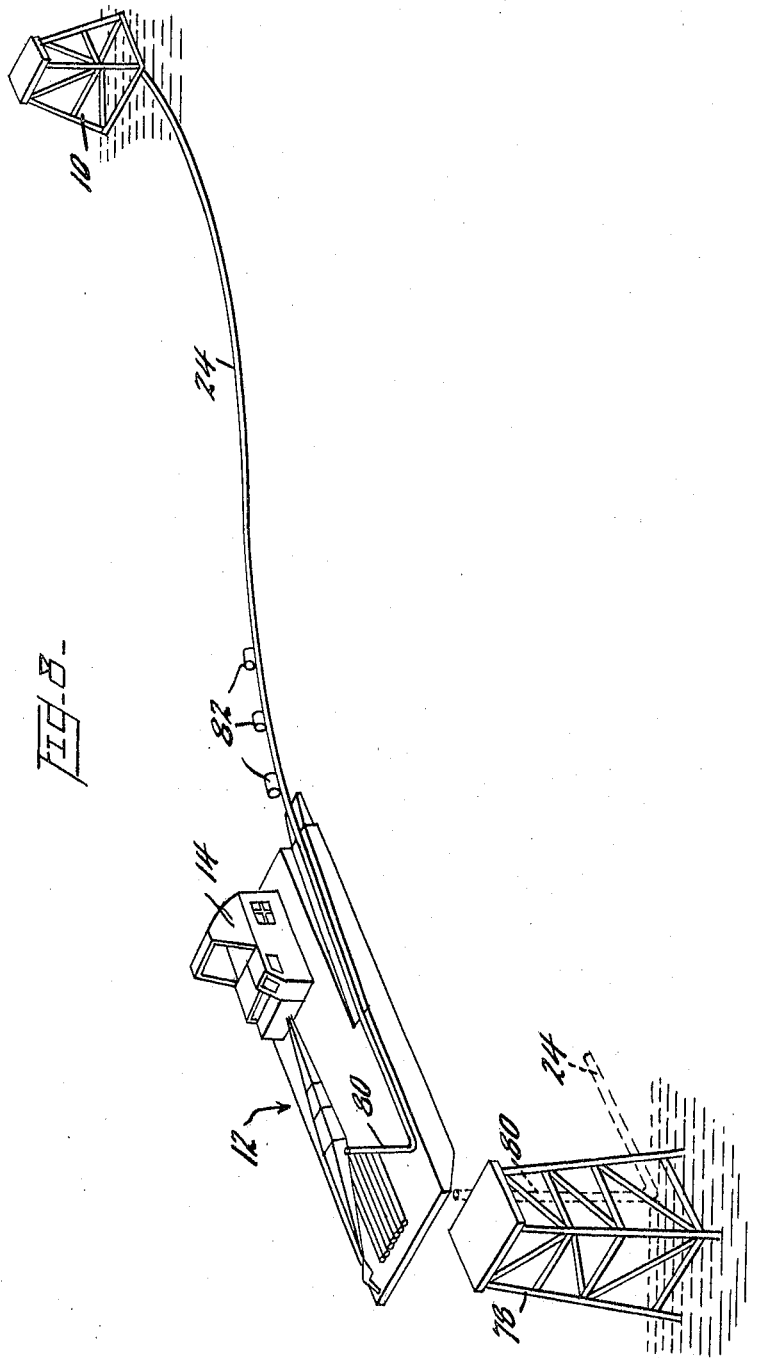

3,491,541
SUBMARINE PIPE LAYING APPARATUS AND METHOD
Dailey J. Berard, New Orleans, La., assignor to Houston Contracting Company, Belle Chasse, La., a corporation of Louisiana
Filed Mar. 30, 1967, Ser. No. 627,083
Int. Cl. F16l 1/00
U.S. Cl. 61—72.3                                12 Claims

ABSTRACT OF THE DISCLOSURE

The invention comprises a method and apparatus for the laying of submarine pipelines. The method includes providing a secure anchor on the sea floor, attaching the end of the pipeline to the anchor and then launching the pipeline from a surface pipe laying means such as a barge, pulling against the anchor to induce a tension force in that portion of the pipeline between the barge and the sea floor to overcome bending stress in the pipe and thus prevent fracturing of the pipe as it is laid. The apparatus includes anchor means, a cable from the anchor to the terminal end of the string of pipe to be laid, a first track guided clamp movable along the surface of the barge, the clamp movement being controlled by hydraulic pressure to maintain tension in the pipeline, and a second, relatively stationary clamp which engages the pipe string while the first clamp is moved to a starting position.

Background of the invention

The invention relates generally to submarine pipe laying and particularly presents a solution to the problem of laying large diameter pipe in relatively deep bodies of water and greatly simplifies laying of pipe in relatively shallow water. The major problems involved are avoiding exceeding the bending stress limits of the pipe while it is laid (such limits being quite low in the case of concrete-clad pipe) and thus prevent kinking in the pipe line or rupture thereof while it is laid.

One of the major developments in the search for oil in the last few decades has been the exploration and development of the offshore oil reserves on the Continental Shelf. Drilling techniques have been developed to the degree that it is now feasible to drill for oil in depths of water approaching a thousand feet or more. Submarine pipe lines are necessary to transport the product from the well to shore, or from several of the wells in deeper water to a transfer station adjacent an offshore platform. This requires pipelines of considerable length.

Such pipelines are assembled in two ways common in the art. The first includes connecting short lengths of pipe together and winding the same onto a spool for later unreeling and laying at a submarine location. The second comprises connecting lengths of pipe together into a single pipeline on board a barge and then lowering the line to the bottom.

Several methods are known in the art for lowering the completed pipeline to the sea floor. One is shown by U.S. Patent No. 2,910,835 which illustrates the use of a string of floats having winch-raised-and-lowered supports depending therefrom to supoprt the pipeline as it is guided to the bottom. One improvement to this concept is shown in U.S. Patent No. 3,280,571 wherein a "ladder" having selectively controlled air tanks therein is used to support the pipeline between the lay barge and the sea floor. Both of these patents disclose cumbersome structures which are both difficult to control and expensive to operate, and which are limited for use in rather shallow water; in a water depth of 100 feet, the submarine support would have to be five to seven hundred feet in length, or a factor two to four times the length of the lay barge.

U.S. Patent No. 3,214,921 is an improvement over the above mentioned devices in that the ladder or submarine support is replaced by a series of air tanks strung out along the pipe at the point where bending stress is most severe. But this invention still requires an underwater support assembly that cannot be visually inspected during its operation.

Finally, U.S. Patent No. 3,266,256 discloses the method of laying a submarine pipeline by induced lateral tension in the unsupported pipestring to overcome bending stress forces. While the patent discusses the axial tension factor to overcome bending stress, such tension is maintained only by the weight of the pipe in water. Additionally, the string is launched vertically beneath the surface of the water so that visual inspection of the string entering the water is impossible. Finally, the minimum launch angle is 60° in this patent limiting usefulness of the method to deep water only. For example a pipe having an outside diameter of 12¾ inches would have to be laid in at least 205 feet of water to avoid exceeding the minimum radius permissible for such pipe—417 feet—when launched at an angle of 60° from the horizontal.

The instant invention overcomes these disdvantages by permitting the laying of submarine pipe lines in both relatively shallow and deep water by inducing and controlling axial tension applied to the pipestring adjacent the launch point of the string, thus eliminating the need for any underwater support means for the pipestring between the launch point and the sea floor. Such tension is steadily and continuously applied to the string and is monitored throughout the pipe laying operation to avoid exceeding the minimum bending stress determined for the unsupported pipe string.

Summary

The gist of the invention is to provide a method for submarine pipe laying which includes inducing axial tension in the unsupported pipestring and maintaining the same throughout the pipe laying operation. Tension is provided by hydraulic control means oeprating against the forward movement of the pipe laying barge. A primary movable clamp. secures the pipeline while the barge is moving between anchorage points while a second, stationary clamp holds the pipestring while the barge is stationary, thus assuring uniform axial tension in the unsupported pipestring. The stationary clamp may be provided with a short stroke pneumatic jack to overcome wave action. Finally, a terminal roller support may be provided near the launch point, at the stern of the pipe laying barge, to assist entry of the pipestring into the water.

Brief description of the drawings

Details of construction and operation according to preferred methods of the invention will become readily apparent by reference to the following drawings wherein:

FIGURE 1 is an elevational, diagrammatic view of the initial stage of a pipe laying operation according to the method of the invention;

FIGURE 2 is a partial elevational view of the stern of the pipe laying barge showing the essential elements of the invention;

FIGURE 3 is a top partial plan view of the invention as shown in FIGURE 2;

FIGURE 4 is an enlarged elevational view similar to FIGURE 2 showing the operation of the invention in dot and dash lines;

FIGURE 5 is a partial, elevational view taken from the right hand portion of FIGURE 4;

FIGURE 6 is a sectional view taken along lines 6—6 of FIGURE 5;

FIGURE 7 is a sectional view taken along lines 7—7 of FIGURE 4; and

FIGURE 8 is a diagrammatic view in perspective showing the terminal stage of a pipe laying operation according to the method of the invention.

Description of the preferred embodiments

Referring now to the drawings by reference character and in particular to FIGURES 1 through 4 thereof, there is shown an offshore drilling platform 10 and a submarine pipe laying barge 12 arranged to perform a pipe laying operation in accordance with this invention. In the embodiment shown, the pipeline is to be constructed from short lengths of pipe, wrapped and coated for protection against the intrusion of salt water into the line. For this purpose, a crane 14 and make up area 16 are provided. The method and manner of constructing the pipe is well-known in the art and forms no part of the instant invention. One such method may be found in the U.S. patent to Timothy, No. 2,910,835.

Once the pipeline is constructed, it passes from a conveyor support 18 to and through a primary, relatively stationary clamp support 20, over a vertical lifting hydraulic jack 22, which is provided to prevent bending in the pipe before launching. Pipeline 24 then passes through movable hydraulically braked clamp support 26, over another conveyor 28 to a terminal roller support 30.

Clamp supports 20 and 26 are illustrated in detail in FIGURES 5 through 7. As shown by FIGURES 5 and 7, support 20 includes a pair of inwardly facing rails 32, 32 secured by bolts to deck 34 of barge 12. A base member 36 is slotted on either side thereof to ride on rails 32, 32. Hydraulic piston jack 38 is centrally located within base 36 and supports block support 40 on the free end thereof by suitable means such as pin 42. A pipe cradle 44 is mounted on block 40 and includes hinged quarter sections 46, 46, whose movement is controlled by hydraulic arms 48, 48. A semi-circular friction shoe 50 is removably located on cradle 44 and each quarter section 46, 46 is also provided with friction shoes 52, 52. The inner curved faces of shoes 50 and 52, 52 are precisely formed to receive a pipe of known outside diameter. If larger or smaller pipe is to be laid, the friction shoes 50 and 52, 52 are replaced with other shoes to match the outside diameter of such pipe.

As can be seen in FIGURE 5, base 36 and block 40 are spaced slightly to allow some pivotal movement of block 40 about pin 42 so that pipeline 24 will not be fractured between clamp support 20 and conveyor 18, where a slight curve in the pipe is accomplished in order to direct the pipe into the water at a slight angle from the horizontal. Jack 38 in base 36 is provided to allow slight vertical adjustment of pipe cradle 44 dependent upon the diameter of pipe to be laid.

A pneumatic tension jack 54 is placed forwardly of rails 32, 32 and includes piston rod 56 formed into depending tongue 58 which is preferably an integral part of base 36. During the period clamp support 20 is engaged with pipeline 24, pneumatic jack 54 automatically compensates for wave action on barge 12 by expanding or contracting in response thereto, so that a constant tension is applied to pipeline 24. In the preferred embodiment jack 54 has a stroke of approximately 5 feet.

FIGURE 7 indicates the internal structure of moving clamp support 26. A base block 60 is slotted to ride on rail 62 on deck 34. A pair of wheels 64, 64 are provided in the undersurface thereof to guide block 60 when moving on rail 62. The upper portion of block 60, has parts including jack 38a, support 40a, pin 42a, pipe cradle 44a and sections 46a, 46a, arms 48a and shoes 50a, 52a, 52a which are constructed and operate in the same manner as the corresponding unlettered numbered parts of clamp support 20.

A pair of piston rods 66, 66 are firmly attached to the rear portion of block 60. Rods 66, 66 are operable through hydraulic cylinders 68, 68, secured between jack 22 and clamp support 20. The stroke of rods 66, 66 is indicated in FIGURE 4, as being between the terminal ends of rail 62.

The operation of the invention includes setting in place an anchor 70 of about 40 tons, on sea floor 72, and attaching a cable 74 from anchor 70 to lead end 76 of pipeline 24 (FIGURE 1). Anchor 70 is situated so that lead end 76 is placed adjacent offshore drilling platform 10. The anchor permits induced tension in the pipeline as soon as the laying operation is begun. The pipeline is laid along a predetermined underwater path by stringing out the line as the barge is moved by any known means, such as by synchronized winches on board the barge attached to anchors laid out along the pipeline route (not shown).

When the barge is stationary, clamp support 20 is engaged with pipeline 24 so as to cause axial tension in that portion of pipeline 24 between roller support 30 and sea floor 72. In this stage, movable clamp support 26 is located in the position shown by dash lines in FIGURE 2. When the barge is moved forward to a new anchorage, clamp support 26 is engaged with pipeline 24 and clamp 20 is disengaged therefrom. As the barge moves, support 26 will move along rail 62 only when the forward movement of the barge exceeds the force of hydraulic fluid in cylinders 68, 68, which equals predetermined tension required in the unsupported portion of pipeline 24. The determination of the tension force required will be explained below. When clamp 26 has moved through the maximum stroke of piston rods 66, 66, or when barge 12 reaches a new anchorage, clamp 20 is reengaged with pipeline 24 and movable clamp 26 is disengaged therefrom. This process continues until the terminal stage of the pipe laying operation.

The terminal portion of the pipe laying operation is indicated schematically in FIGURE 8. Upon reaching a transfer station 78, the setting of a riser 80 on the pipeline 24 may be accomplished by attaching buoys 82 along predetermined intervals of the terminal end of pipeline 24 to prevent bending and fracturing in the terminal end. Riser 80 may then be attached. The terminal end of pipeline 24 may then be lowered to the sea floor by davits (not shown). The operation is completed by removal of buoys 82 from pipeline 24.

The bending stress of a pipeline is related by inverse proportion to the radius of curvature in the pipeline. The most important calculation that needs to be made is the minimum radius of curvature, in order to avoid exceeding the allowable curvature thereby causing fracturing of the pipe as it is laid. For purposes of illustration, an X-56 steel pipeline is to be safely laid in 100 feet of water. The outside diameter of the pipe is 12¾"; wall thickness of the pipe is 0.312" a concrete protective coat of 1.25" thickness is to be applied along with a wrap coating 0.1875" thick. The modulus of elasticity for the pipe is $3 \times 10^6$ pounds per square inch, and the maximum bending stress desirable in the completed pipe is 3500 pounds per square inch. Additionally, a factor of 1.4 will be computed with the maximum bending stress to allow for excess stress due to the action of waves and swells.

Using figures for the strength of material employed, a formula can be used to determine the minimum radius permissible for the pipe:

$$R = \frac{EC}{Sc} \times Fa$$

where:

R=minimum radius in feet;

E=modulus of elasticity for the pipe, $3 \times 10^6$ pounds 1 sq. in.;

C=outside diameter of the pipe, in feet, divided by 2;
Sc=Maximum desirable bending stress 3500 pounds/sq. in.; and
Fa=Allowance factor for waves and swells (1.4).

Using the figures given, R=1269 feet.

The weight of a linear foot of the pipe in water is easily determined by subtracting the weight per linear foot of pipe of water displaced from the weight per linear foot of the pipe, out of water. The weight of the wrap coating is 6.08 pounds per linear foot, the weight of the steel pipe is 41.51 pounds per linear foot, and the weight of the concrete coating is 64.00 pounds per linear foot. Thus the total weight of the pipe is 111.59 pounds per foot. The weight of water displaced per linear foot using the pipe in this illustration is 85.12 pounds per linear foot, leaving a weight of 26.47 pounds of pipe per unsupported linear foot of pipe in water.

Maintaining the specific radius of curvature, 1269 feet in this illustration, the span of the unsupported pipe between the launch point of the pipeline and the sea floor can be determined by the equation:

$$L=\sqrt{12RYb+9R^2\theta b^2}-3R\theta b$$

L=the unsupported length of the pipe in feet;
R=radius of curvature of the pipe in feet;
Y=vertical distance, lanch point to sea floor in feet; and
$\theta b$=launch deviation angle from the horizontal, in radians.

Assuming Yb=100 feet and $\theta b$=6° or 0.1047 radian, the unsupported length L is 897 feet. Multiplying this factor by the weight of pipe per linear foot means that a tensile force of 23,744 pounds or approximately 24,000 pounds is necessary to maintain a radius of 1269 feet in the unsupported pipeline. The cross-sectional area of the pipe in illustration, including concrete coating and wrapping, is 191.52 square inches, so that the axial stress exerted on the pipe is 24,000 pounds/191.52 square inches or approximately 125 pounds per square inch. Since total stress in the pipe is the sum of the bending stress and tensile stress, the total maximum stress at any point in the line is 3625 pounds per square inch, well within the tolerable stress limits of X-56 concrete coated pipe, which has a stress limit on the order of ten times that induced by the pipe laying method of the invention. If the depth of the water is increased to 150 feet, the axial tension force becomes approximately 160 pounds per square inch, and if the depth is 200 feet, the induced axial tension force becomes about 190 pounds per square inch. It is readily apparent that operations at greatly increased depth have but minimal effect on total stress forces exerted on the pipeline.

The required induced axial tension forces is applied to pipeline 24 through hydraulic cylinders 68, pistons 66 and moving clamp support 26. Cylinders 68 are loaded with sufficient hydraulic force so that rods 66 and support 26 will move, allowing the pipeline to be advanced to sea floor 72, only when forward movement of barge 12 exceeds the braking force (24,000 pounds in the illustration) loaded into cylinders 68. Of course, when the barge is stationary and support 26 is being cycled to a starting position, clamp 20 will maintain the pipe in proper axial tension, clamp 20 being engaged when support 26 is being recycled. Thus, the minimum axial tension required is maintained in pipeline 24 during the pipe laying operation to prevent buckling or fracturing of the pipeline.

It is readily apparent from the foregoing that I have invented a new and highly useful apparatus and method in the art of submarine pipe laying and in this I am not to be limited to the specific embodiment hereinbefore provided, except as may be deemed to be within the scope of the following claims.

I claim:
1. The method of laying a submarine pipeline from pipe laying means travelling along the surface of a body of water and paying out a string of pipe initially disposed horizontally comprising establishing a desired route for the completed pipeline, selecting the particular pipe to be laid, calculating the minimum radius of curvature for said pipe within the elastic bending stress limits for said pipe, determining an induced axial force necessary for said pipeline to maintain in said pipeline a bending radius greater than said minimum radius of curvature, initiating laying of said pipeline by providing secure anchorage means therefor adjacent the floor of said body of water, securely clamping said pipeline to a first stationary support on said pipe laying means when said pipe laying means is stationary, engaging said pipeline with a substantially horizontally movable second support, braked against movement with respect to the pipe laying means by a force substantially equal said axial tension force, disengaging said stationary support, moving said pipe laying means away from said anchorage along said route to a point approximating the stroke distance of said braking means, substantially stopping movement of said pipe laying means, reengaging said first stationary support, with said pipeline, disengaging said second movable support from said pipeline, and recycling said movable support to a starting position.

2. The method of claim 1 wherein said pipeline is maintained within a bending radius greater than said minimum radius of curvature by an induced axial tension force predetermined from the relationship:

$$T=LF$$

where:
T=axial tension force;
F=weight per unit of the pipeline in water; and
L=the unsupported length of pipeline in water between the pipe laying means and the floor of said body of water, L determined by the relationship:

$$L=\sqrt{12RYb+9R^2\theta b^2}-3R\theta b$$

where:
R=minimum radius of curvature within the bending stress limits of the pipeline;
Yb=vertical distance from the pipe laying means to the floor of the body of water; and
$\theta b$=angle of deviation of entry of the pipeline into the water from the horizontal, measured in radians.

3. The method of claim 1 wherein initiation of laying said submarines pipeline comprises establishing a secure anchorage adjacent the floor of said body of water, and a point for the initial end of said pipeline on the floor of said body of water adjacent said anchorage, stringing cable means from said anchorage to the initial end of said pipeline disposed on said pipe laying means, determing a length for said cable means approximating the distance from said anchorage to said point for the initial end of the pipeline, and paying out the pipeline under controlled, predetermined axial tension from the pipe laying means.

4. The method of claim 1 wherein laying of said pipeline is terminated by attaching a series of buoys at predetermined points adjacent the distal end of said pipeline for maintaining said pipeline within a bending radius greater than said minimum radius of curvature, attaching a vertical, riser pipe to the said distal end, disengaging said pipeline from said clamping means and said braking force, and lowering said distal end to the floor of the body of water while deflating said buoys.

5. On a barge adapted for the laying of submarine pipe lines by a method wherein axial tension is induced to that part of the pipeline unsupported between the barge and the floor of the body of water to assure a minimum radius of curvature of said unsupported length of pipe, means inducing said axial tension force comprising a first stationary clamp support, adapted to secure said pipeline to the barge, a second clamp support, movable with respect to the barge, and adapted for engagement with said pipeline when said stationary clamp is released and when said barge is moving to discharge the pipe line, and braking means limiting movement of said second, movable clamp support, said second clamp movable only when forward movement of the barge produces a force against said braking means exceeding said axial tension force.

6. The device of claim 5 wherein said stationary clamp and said movable clamp each comprise a base, a vertical hydraulic jack within said base, a block mounted on the working end of said hydraulic jack, a pipe cradle supported on said block, openable clamp means mounted on said cradle, and removable friction shoe means within said cradle and said clamp means respectively for firmly engaging said pipeline.

7. The device of claim 6 wherein said stationary clamp base and said barge are provided with cooperative means for limited horizontal movement of said base thereover, said base being further provided with a pneumatic brake cylinder operably connected therewith, said pneumatic cylinder being under pressure whereby undulations in said barge caused by wave and swell action on said water cause said pneumatic cylinder to expand and contract so that a uniform axial tension force is applied to said pipeline when said stationary clamp base is engaged therewith.

8. The device of claim 5 wherein said braking means comprises a pair of hydraulic cylinders, a pair of pistons, one for each of said cylinders, and a pair of piston rods, one for each of said pistons, the free distal end of each of said piston rods connected to said movable clamp support, each of said cylinders being under a pressure at least equal said axial tension force and so disposed that when said movable clamp is engaged with said pipeline, movement of said barge causing a force exceeding said minimum axial tension force causes said piston rods and movable clamp to traverse said barge a distance approximating the stroke of said piston rods thereby causing said pipeline to enter the water.

9. The device of claim 8 wherein guide rail means is provided for said movable clamp support having a length substantially equal the stroke of said piston rods, said guide rail means disposed substantially parallel to said piston rods.

10. The device of claim 5 wherein a vertical hydraulic jack having support means is provided between said stationary clamp support and said movable clamp support to limit bending of said pipeline therebetween.

11. The device of claim 5 wherein pipe support means having rollers therein is attached to the rear of said barge, behind said means for inducing axial tension force in said pipeline, for guiding said pipeline into the water therefrom.

12. The method of claim 1 wherein the step of substantially stopping movement of said pipeline means includes the further step of anchoring said pipe laying means.

References Cited

UNITED STATES PATENTS

| | | | |
|---|---|---|---|
| 2,870,639 | 1/1959 | Suderow | 61—46.5 X |
| 3,247,674 | 4/1966 | Macardier | 61—72.3 |
| 3,273,346 | 9/1966 | Delarvelle et al. | 61—72.3 |
| 3,280,571 | 10/1966 | Hauber et al. | 61—72.1 |
| 3,321,925 | 5/1967 | Shaw | 61—72.3 |
| 3,331,212 | 7/1967 | Cox et al. | 61—72.3 |
| 3,258,928 | 7/1966 | Broadway et al. | 61—72.3 |
| 3,390,532 | 7/1968 | Lawrence | 61—72.3 |

JACOB SHAPIRO, Primary Examiner

U.S. Cl. X.R.

214—1.1